Aug. 15, 1961 S. D. DUNN 2,996,127
AUTOMATIC TRACTOR AND IMPLEMENT ATTACHING STRUCTURE
Filed Oct. 15, 1957
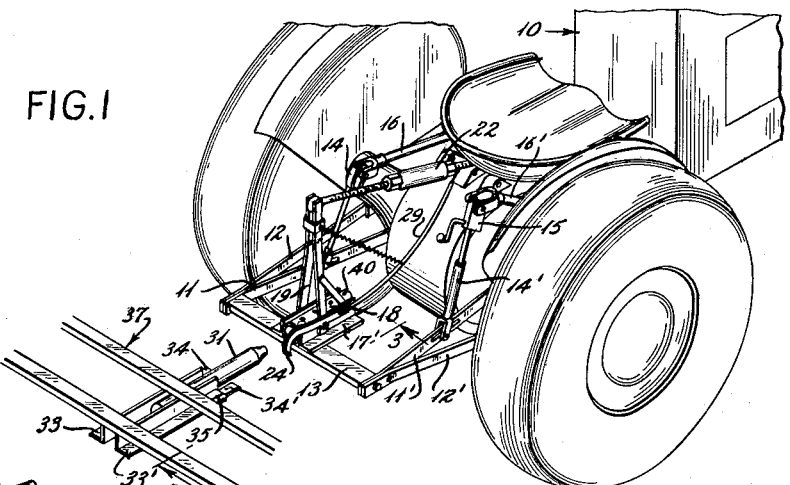
FIG.1
FIG.7
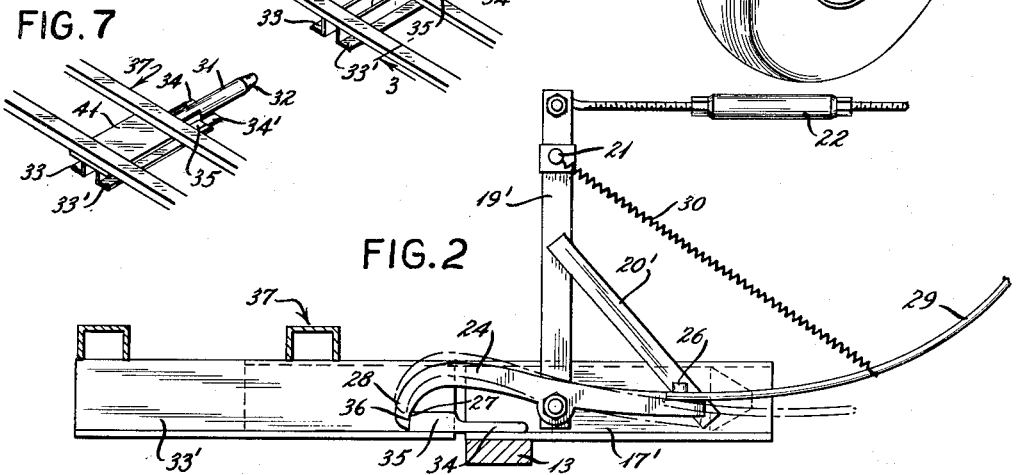
FIG.2
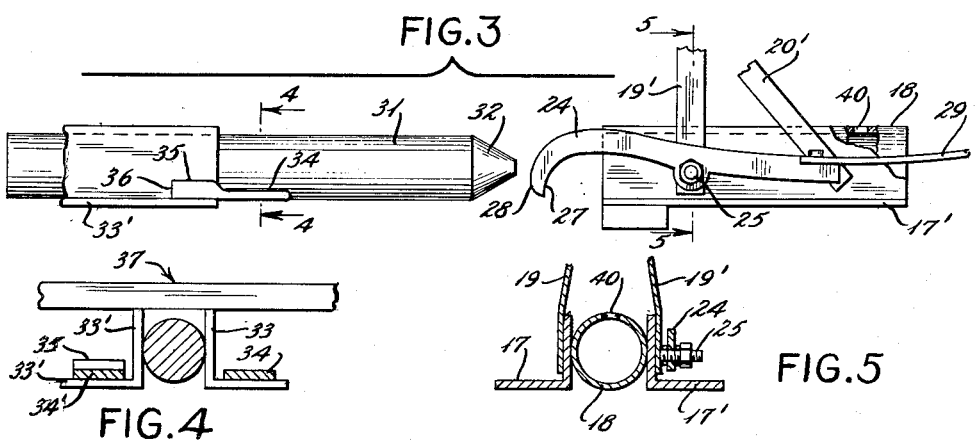
FIG.3
FIG.4
FIG.5
FIG.6
INVENTOR
S.D. DUNN

United States Patent Office 2,996,127
Patented Aug. 15, 1961

2,996,127
AUTOMATIC TRACTOR AND IMPLEMENT ATTACHING STRUCTURE
Samuel Dow Dunn, Rte. 2, Purcell, Okla.
Filed Oct. 15, 1957, Ser. No. 690,274
3 Claims. (Cl. 172—275)

The present invention relates to power equipment and more particularly to agricultural tractors and the attachment of plows, harrows, cultivators or the like implements to a tractor having two lifting arms supporting a drawbar to which the implement may be attached.

Heretofore various types of couplings and hitches have been used for attaching an agricultural implement or machine to a tractor but these prior devices have not been entirely satisfactory because of the difficulty of making the connection, the uncertainty of the connection and the danger of damage to the equipment in the event of striking a large obstruction. Also the prior connections have not provided for automatic connection with angular adjustments to obtain the optimum operating characteristics of the equipment.

An object of the present invention is to overcome the deficiencies of the prior art and to provide a coupling which can be operated by the tractor operator without leaving his seat whereby an implement may be connected or disconnected with a minimum loss of time.

A further object is to provide a coupling which will automatically be connected and which can be manually released or released by an excessive force to prevent damage to the equipment.

Other objects and advantages of the invention will be apparent from the following description taken in conjunction with the accompanying drawing wherein:

FIG. 1 is a perspective view of a tractor with the two-lever lifting mechanism applied thereto and showing an implement in position to be attached to the tractor by the coupling arrangement of the present invention;

FIG. 2, a view on an enlarged scale showing the latching mechanism in elevation with the implement in coupled relation;

FIG. 3, a section taken on line 3—3 of FIG. 1, showing the coupling just prior to engagement;

FIG. 4, a section on line 4—4 of FIG. 3;

FIG. 5, a section on line 5—5 of FIG. 3;

FIG. 6, an elevation of a modified drawbar for use with a plow having two beams to provide clearance for the forwardmost beam; and FIG. 7, a perspective of the male coupling element mounted on a plate attached to an implement.

Briefly stated the present invention includes a hollow cylindrical coupling device for fixed attachment to a drawbar on a conventional tractor having lifting arms for the drawbar and a control arm therefor. An implement to be secured to the tractor is provided with a projection for reception in the cylindrical hollow member and the implement is also provided with a pair of straps for engaging the drawbar to prevent rotation of the implement about the axis of the projection and of the hollow cylindrical member. A releasable latch is located exteriorly of the tubular member and projection and mounted for operation by the operator seated on the tractor to provide for automatic engagement and manual release of the implement.

With continued reference to the drawing the present invention is applied to a conventional tractor 10 having lifting arms 11, 11' pivotally mounted on a horizontal axis adjacent the gear housing and guide levers 12, 12' are pivoted to the tractor adjacent the wheels; such lifting arms 11, 11' and guiding levers 12, 12' pivotally support a drawbar 13 in a well known manner. The lifting arms 11, 11' are raised by means of links 14, 14', the link 14' being adjustable as to length by the conventional mechanism 15 which may include a crank and screw. The upper ends of the links 14, 14' are connected to the lifting crank arms 16, 16' of conventional construction and operated by the hydraulic mechanism of the tractor or by other suitable means whereby the lifting arm 11, 11' can be raised or lowered in a well known manner.

Secured by welding or the like to the drawbar 13 are angular bars 17, 17' between which a hollow cylindrical member 18 is secured by welding or the like. Extending upwardly from the angular bars are strut elements 19, 19' fixed to the corresponding angular bars at their lower ends and braced with respect thereto by diagonal braces 20, 20', the upper ends of such strut elements 19 and 19' being held in fixed relation by a bolt 21 or the like. Pivotally attached to the upper ends of the struts 19, 19' is a turnbuckle adjustable control link 22 which is adjustable by a conventional turnbuckle arrangement with the forward end of the link pivotally connected by a conventional pivot pin to lugs 23.

An F-shaped lever 24 is pivotally mounted by its intermediate cross member on a bolt 25 fixed to the strut 19' on a center 1¼" above the horizontal flange of angle bar 17', the lower end of the stem of the F-shaped lever engages a stop 26 fixed to the diagonal brace 20' to limit the pivotal movement in a counterclockwise direction as observed in FIGS. 1 and 2. In this position of the lever 24, a lug engaging portion 27 is substantially vertical while a cam portion 28 on the exterior provides for clockwise movement in the latching operation. The extreme end of the top cross member of the F-shaped lever is approximately ¼" above the plane of the upper surface of the horizontal flange of angle bar 17'. A handle 29 is fixed to the stem of the F-shaped lever and extends upwardly to a convenient position for manipulation by the operator of a tractor seated thereon while a tension coil spring 30 extending between bolt 21 and the handle 29 provides a resilient force to maintain the F-shaped lever latch in operative position. This structure provides a finger tip release for the implement.

For cooperation with the female cylindrical member 18, a male projection 31 of approximately 2¹⁵⁄₁₆" in diameter and tapered at its forward end 32 is adapted to be received within the 3⅛" bore of the hollow member 18. The projection 31 is fixed to other angle bars 33, 33' affixed on an implement such as a two-bottom plow, two-row cultivator, lister planter or the like and a rearward extension of the projection 31 is fixedly secured to such angle bars 33, 33' by welding or the like with the projection 31 extending forwardly a distance corresponding to the length of the hollow cylindrical member 18, approximately 12". Affixed to the horizontal flanges of the other angle bars 33, 33' and spaced from the vertical flanges thereof are strap elements 34, 34', the forward end of strap 34 being bevelled on its under surface while the forward end of strap 34' is rounded so that its upper edge may cooperate with the cam surface 28 of the F-shaped lever 24, the bevelling of the under surface of the straps assisting in guiding such straps over the horizontal flanges of angle bars 17, 17'. A block 35 is fixed to the rear end portion of the strap 34 and the rear ends of such strap 34 and block 35 cooperate with the generally vertical latch surface 27 of the F-shaped lever. The vertical surface 27 of the F-shaped lever is substantially 6⅝" from the center of pivot bolt 25 and the forward ends of the other angle bars 33, 33' are adapted to almost abut the rear ends of angle bars 17, 17', with a clearance of approximately ¹⁄₁₆", and in which the latching surface 27 will positively engage the rear ends 36 of the strap 34 and block 35. The lower extremity of the top cross member of the F-shaped lever is designed to be spaced from the horizontal flange of said other angle bar 33, approximately ¼", which relation is maintained by the stop 26 acting on the F-shaped lever 24, the strap 34 and block 35, each being approximately ½" thick and making a total depth of 1".

From the above description it is believed that the operation of the coupling structure should be apparent. The implement 37, such as a two-bottom plow or two-row cultivator or other implement will normally rest in a position such that the male projection 31 is approximately horizontal and the operator of the tractor then backs the tractor toward the implement so that the tapered end 32 will enter the rear end of the hollow cylindrical member 18. In the event that the hollow cylindrical member is not at the correct height, the operator will raise or lower the lifting arms 11 and 11' by controls on the tractor to obtain the correct height and if the implement is at an angle due to unevenness of the ground or due to the construction thereof, the operator may manipulate the link adjusting means 15 which will cause the lifting arm 11' to be raised or lowered to change the angularity thereof. In the event that the projection 31 is not horizontal, the hollow tubular member 18 may be adjusted to obtain the same angularity by means of the turnbuckle control link 22 which may be manipulated by the tractor operator.

Assuming that the adjustments are correct, the operator then backs the tractor so that the hollow tubular member 18 receives the projection 31 and the operator continues to back the tractor until the latch lever 24 engages the forward rounded end of strap guide 34' so that the camming portion 28 of the F-shaped lever will ride upwardly and, upon further backing, the latching surface 27 of the F-shaped lever will engage the rear ends 36 of the strap 34' and block 35 forming a lug. It will be noted that the bevelling on the under surface at the front of strap guides 34 and 34', will assist in guiding such straps over the upper surface of the horizontal flanges of the angle bars 17 and 17' and when the coupling is complete, the implement 37 will be positively supported on the drawbar 13 so that the operator on the tractor will have positive control of the implement at all times. The implement 37 is prevented from rotation about the axis of projection 31 by the straps 34, 34' engaging angle bars 17, 17', while angularity can be controlled by the crank and screw adjustment 15 for varying the length of link 14'.

It will be evident that the operator of the tractor can make the connection and disconnection to the implement without having to get down from the seat.

Frequently the tractor and implement are on irregular ground so that the projection 31 does not extend horizontally. The coupling of the implement to the tractor can be made within wide deviations by the present invention and the turnbuckle link 22 can be adjusted to move the axis of tubular female member 18 upwardly or downwardly and variations in lateral slope can be compensated for by adjustment of link 14' by crank and screw adjustment 15.

The drawbar 38 (FIG. 6) is shown as having an arch 39 which is adapted to extend over the forwardly beam of a plural bottom plow. Such beams normally carry the cutter disk for making a cut in the soil in advance of the plow.

A plurality of ⅝" observation apertures 40 are provided in the upper portion of tubular member 18 approximately 3" from each end for observation of alignment of the male projection 31 with respect to the tubular member 18, whereby the operator can make adjustments to avoid binding during the coupling operation.

The coupling elements may be fixed to plates 41 and the plates with the coupling elements may be mounted on the tractor and implement by bolts, welding or the like thereby simplifying the attachment thereof. It will also be apparent that the socket may be mounted on the implement and the projection mounted on the drawbar and obtain many of the advantages of the present invention.

It will be understood that a bulldozer may be mounted by means of the coupling arrangement of the present invention on the front of a tractor as well as at the rear. When the mounting is at the front suitable linkage mechanism operable from the hydraulically operated lifting crank arms of the tractor may be provided for obtaining power for lifting the bulldozer blade.

From the above description it is believed that the utility of the invention will be understood and it will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An attaching device for coupling an implement to a tractor, said coupling device comprising an elongated hollow cylindrical member for attachment to the drawbar of a tractor, a pair of angle members on opposed sides of said hollow member and fixed thereto, a cylindrical projection for securement to an implement and of the size to be received within said hollow cylindrical member, said projection having a tapering end to provide for ready insertion thereof into said hollow member, other angle members fixed to said projection on opposed sides thereof, a strap member on each of said other angle members of said projection adapted to engage the upper surfaces of the corresponding flanges of the angle members on said hollow cylindrical member, a lug fixed to one of said straps of said projection, an F-shaped latch hook pivotally mounted by its intermediate cross member on the angle of said hollow cylindrical member corresponding to said one angle of said projection with the top cross member of said F-shaped lever adapted to engage the lug on the corresponding said one angle member of said projection, the pivot point of said F-shaped lever and the free end of the top cross member being so arranged as to retain the implement in position but with the offset between the pivot and the top cross member being such as to release the attaching device upon excessive force on said implement.

2. An implement coupling comprising a draw bar, a tubular socket of substantially circular cross-section mounted on said draw bar with its axis transverse to said draw bar, an implement having a projection of substantially circular cross-section extending therefrom for reception into said socket, guide means mounted on the implement and extending forwardly therefrom, said guide means having guide portions which extend laterally beyond each side of the projection, said guide portions being so mounted that they engage said draw bar after partial insertion of the projection into the socket and when said portions are aligned with said draw bar so that said projection may be more fully engaged in said socket to prevent rotational movement of said projection with respect to said socket and an automatically releasable latching means mounted on said drawbar and implement frame for retaining said projection and said socket in fully engaged position.

3. An implement coupling comprising a draw bar and an implement frame, a tubular socket mounted on one of said draw bar and implement frame, the other of said draw bar and implement frame having a projection extending therefrom for reception within said socket, guide means of less length than said projection mounted on the other of said draw bar and implement frame, cooperating guide means having cooperating guide portions mounted on the one of said draw bar and implement frame, said guide means being adapted to engage said cooperating guide means on the one of said draw bar and implement, said guide means having guide portions positioned laterally beyond each side of said projection, said guide portions on said guide means engaging said cooperating guide portions on said cooperating guide means after partial insertion of said projection into said socket and when said guide portions are in registry with respect to said draw bar so that when said projection is further projected into said socket rotational movement of the implement frame with respect to the draw bar will be prevented, and releasable latching means mounted on said draw bar and implement frame to retain said projection and said socket in the fully engaged position.

References Cited in the file of this patent

UNITED STATES PATENTS

| | | |
|---|---|---|
| 2,602,389 | Markel | July 8, 1952 |
| 2,645,073 | Dalglish et al. | July 14, 1953 |
| 2,701,510 | Altgelt | Feb. 8, 1955 |
| 2,753,192 | Davis | July 3, 1956 |
| 2,762,282 | Mason et al. | Sept. 11, 1956 |
| 2,776,613 | Orelind | Jan. 8, 1957 |
| 2,777,376 | Schwegler | Jan. 15, 1957 |
| 2,897,904 | Schwegler | Aug. 4, 1959 |

FOREIGN PATENTS

| | | |
|---|---|---|
| 1,080,152 | France | May 26, 1954 |
| 907,002 | Germany | Mar. 18, 1954 |

OTHER REFERENCES

Publication: German application, W13396 III/45a, Nov. 8, 1956.